United States Patent [19]

Reilly

[11] Patent Number: 5,024,560
[45] Date of Patent: Jun. 18, 1991

[54] METHOD AND APPARATUS FOR PROTECTION AGAINST COASTAL EROSION

[76] Inventor: Joseph W. Reilly, 2552 Prancer, New Orleans, La. 70131

[21] Appl. No.: 532,855

[22] Filed: Jun. 4, 1990

[51] Int. Cl.$^5$ .............................................. E02B 3/12
[52] U.S. Cl. .................................. 405/303; 249/108; 264/333; 405/16; 405/33
[58] Field of Search ................. 405/15, 16, 21, 25-35, 405/258; 249/108, 90, 83, 175; 264/333, 267

[56] References Cited

U.S. PATENT DOCUMENTS

| | | | |
|---|---|---|---|
| 800,221 | 9/1905 | Larimer | 249/108 |
| 938,024 | 10/1909 | Sigler | 249/108 |
| 1,160,235 | 11/1915 | Zwicker | 249/108 |

FOREIGN PATENT DOCUMENTS

| | | | |
|---|---|---|---|
| 2156277 | 5/1973 | Fed. Rep. of Germany | 405/16 |
| 2324214 | 11/1974 | Fed. Rep. of Germany | 405/33 |
| 1110856 | 8/1984 | U.S.S.R. | 405/35 |
| 1312130 | 5/1987 | U.S.S.R. | 405/16 |

Primary Examiner—Dennis L. Taylor
Attorney, Agent, or Firm—Thomas S. Keaty

[57] ABSTRACT

The invention relates to a method and apparatus for protection against coastal erosion. The protection barrier is formed from a plurality of protection members which are secured together to form a mat of a desired configuration. Each protection member which is formed as a toroidal body, preferably from a discarded tire casing, is at least partially filled with concrete which is deposited about the circumference of the tire casing and occupies not more than one half of the interior chamber formed by the wall of the tire casing. To facilitate preparation of the protection member for use, a conical insert is provided. The tire casing is lowered down over the conical insert, moving towards the wided base of the insert until a lower bead of the casing rim frictionally contacts the wall of the insert. Concrete is then admitted onto the wall of the insert and moves by gravity into the interior chamber, partially filling it. Once the concrete is hardened, the tire casing is lifted, allowing it to be connected with other similarly formed protection members.

5 Claims, 2 Drawing Sheets

METHOD AND APPARATUS FOR PROTECTION AGAINST COASTAL EROSION

BACKGROUND OF THE INVENTION

This invention relates to methods of protection against coastal erosion, and more particularly to the apparatus and method for protection against coastal erosion utilizing discarded automobile tire casings used as a barrier when positioned along a shore line.

A long recognized problem of soil erosion from earth-water interface has caused gradual erosion of thousands of miles of shore line over the past years. Various solutions have been offered to solve this problem and to prevent or, at least partially, arrest continuous erosion of earth. Some of the known solutions involve creation of artificial walls along the shore line, the walls being constructed from concrete blocks joined together to form an artificial barrier. Other solutions involve the use of discarded vehicle tires which are secured together to form layers of protective barriers to prevent further erosion. The tires are believed to be ecologically safe and, in addition to solving waste disposal problem, offer a practical inexpensive solution for constructing retaining walls, bulk heads, revetments and the like.

One of the known solutions is shown in U.S. Pat. No. 3,934,540 issued on Jan. 27, 1976 to A. G. Bruner et al for "Barrier". In that patent a plurality of tires are imbedded in a concrete block and held together by reinforcement rods, with the tires extending upright and across the concrete block.

Another solution is offered in U.S. Pat. No. 4,139,319 issued on Feb. 13, 1979 to E. C. Anderson for "Motor Vehicle Rubber Tires and Concrete Revetment", which discloses a flexible monolithic mat of tires woven together with reinforcing holding rods and concrete. The rubber tires are arranged in a horizontal plane with four tires tangent to each other.

SUMMARY OF THE INVENTION

The present invention contemplates provision of an apparatus for protection against coastal erosion which utilizes vehicle tires and a method of forming the apparatus for such use.

It is therefore an object of the present invention to provide an improved apparatus for protection against coastal erosion which is inexpensive and easy to manufacture.

It is a further object of the present invention to provide an apparatus for protection against coastal erosion allowing marine life to find its habitat within the barrier.

It is still a further object of the present invention to provide a method of preparing individual tires for subsequent joining together to form a mat.

These and other objects of the present invention will be more apparent to those skilled in the art from the following detailed description of the invention.

The present invention achieves its objects by providing a plurality of protection members which are secured together to form a barrier for positioning along a coast line to be protected. Each protection member comprises a generally toroidal hollow body with a central opening therethrough, said body being at least partially filled with concrete. The toroidal body can be formed from discarded tire casing which is environmentally safe and long lasting. The tire casing is prepared for use as a protection member by partially filling the chamber of the casing with concrete.

The method of preparing the protection member comprises the step of providing a conical insert having a base diameter which approximates the diameter of the central opening formed in the tire casing or in the toroidal body. The conical member is positioned on its base on a horizontal surface and the toroidal body is slipped over it and allowed to move downward towards the base of the conical member until a lower bead of the rim frictionally contacts the continuous wall of the conical insert.

A concrete mixture is then poured or pumped on the inclined wall of the conical insert and is allowed to move downwardly, by gravity, towards the interior chamber of the toroidal member or tire casing, partially filling the chamber with concrete. After the concrete is hardened, the toroidal member or the tire casing is lifted, disengaging it from the conical insert and is secured with likewise prepared protection members by cables or chains into a mat of desired configuration.

To assist in reinforcing the concrete mass, a reinforcing ring is secured within the chamber a distance from the side walls of the toroidal member or the tire casing, with the help of an elongated screw which passes through the wall of the toroidal member or the tire casing to a distance at which the ring is to be secured. It is preferred that the angle of inclination of the wall of the conical insert be between 3–10 degrees to allow enough space between the wall of the conical member and the upper bead of the rim for admitting mixture into the chamber formed by the tire casing.

BRIEF DESCRIPTION OF THE DRAWINGS

For a better understanding of the nature and principles of the present invention, a reference will be made to the following drawings, wherein.

DETAILED DESCRIPTION OF THE PREFERRED EMBODIMENT

Figure 1:
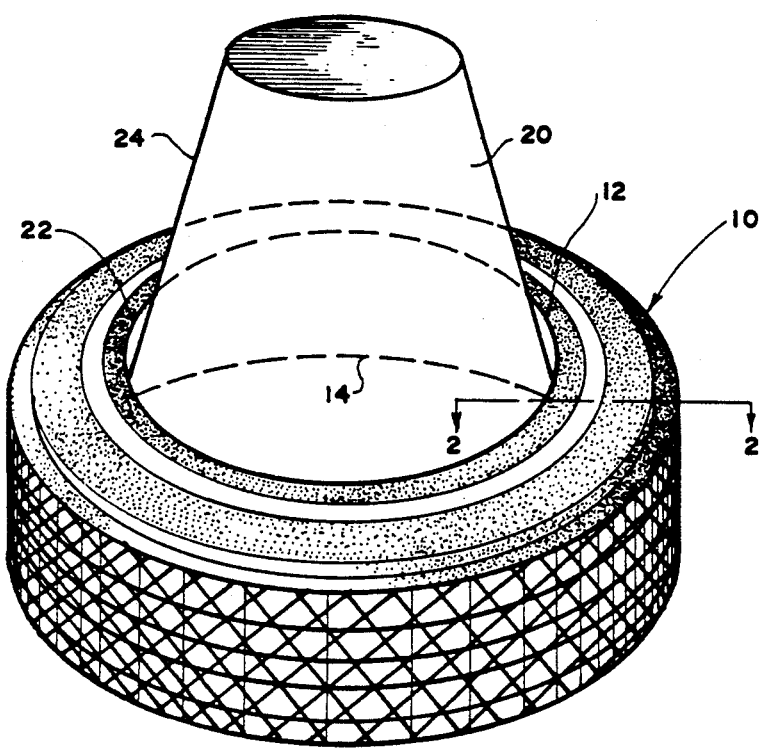
FIG. 1 is a perspective view illustrating a method of forming an element of the apparatus of the present invention.

Referring now to the drawings in more detail, wherein like parts are designated by like numerals, and wherein numeral 10 designates a discarded tire casing which typically has a general U-shape in cross section and is tubular in form. The vehicle tires are usually constructed of a plurality of layers of material joined together to form a uniform continuous wall(s).

Each tire has a rim which is normally occupied by a steel rim of an automobile. For the purposes of illustration, the upper bead of the tire 10 is designated by numeral 12 in the drawings, while the lower bead of the tire is designated by numeral 14. An opening 16 is formed between the beads 12 and 14, as shown in cross sectional view of FIG. 2, with an open chamber 18 formed within the circumference of the U-shaped tire 10.

Figure 2:
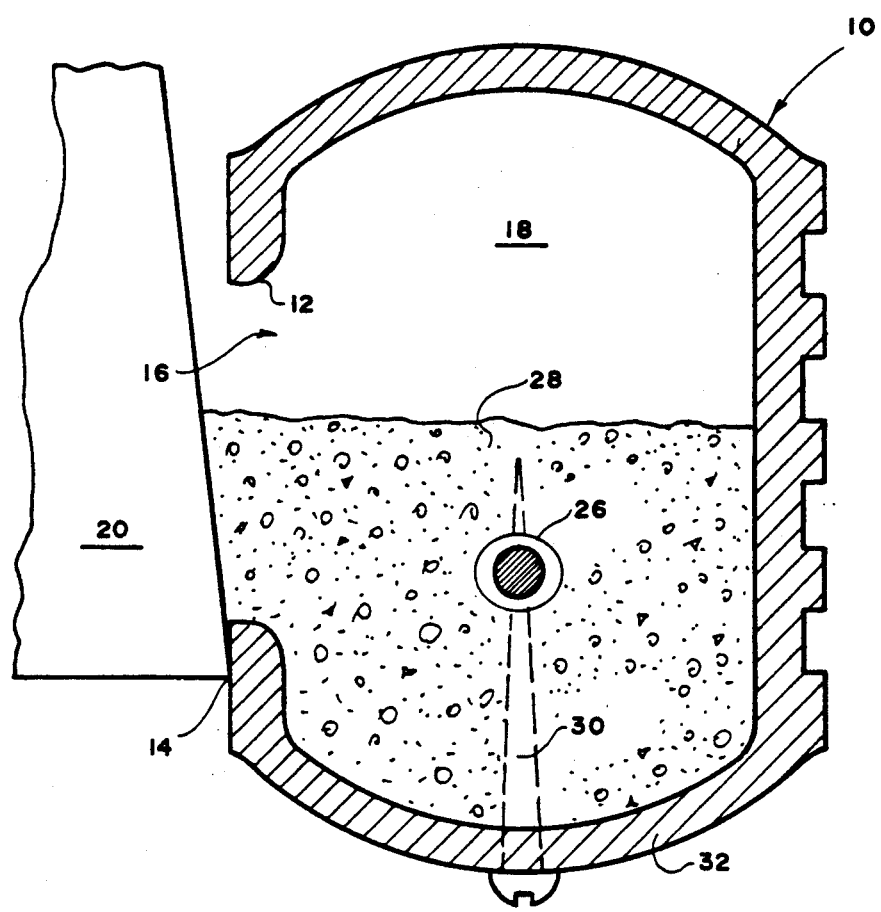
FIG. 2 is a cross sectional view taken along lines 2—2 of FIG. 1.

Since the tire casings are relatively light when submerged in water, the present invention contemplates increasing of the weight of each tire casing by deposition of concrete to approximately one half of the chamber 18, as shown in FIG. 2. In order to achieve this purpose, a conically-shaped insert 20 is placed with its widest base on a horizontal surface, the angle of inclination of the side wall of the cone being approximately 5 degrees.

The tire 10 is then lowered on the conical insert 20, such that the lower bead 14 of the tire fits snugly against the wall of the conical member 20. Due to the upward inclination of the conical member 20, the upper bead 12 of the tire 10 does not contact the bead 12, leaving a space 22 between the upper rim 12 and the wall 24 of the conical member 20. Concrete is then poured around the conical member 20, allowing it to flow downward along the inclined surface of the wall 24 and fill the chamber or cavity 18 up to about mid portion thereof.

If desired, a reinforcing ring 26 can be deposited within the concrete mass 28 when it is filled to about one half of its intended height. The reinforcing ring 26 can be a circular rod which will assist in retaining by the concrete of its intended shape and strength. In order to retain the ring 26 in place, a securing screw 30, or other securing means can be used by passing the screw 30 through an aperture formed in the side wall 32 of the tire casing 10. The securing screw 30 is centered in the concrete, thus centering position of the ring 26 within the concrete mass 28 which fills the tire casing to approximately one half of its height.

The diameter of the conical insert 20 varies, depending on the size of the rim diameter of different tire casings. Once the concrete mass 28 is hardened, the conical insert 20 is disengaged from the tire casing 10 and is used for preparation of other tire casings in the manner similar to that described above.

As a result, the tire casing 10 has a considerably greater weight than a typical tire casing without concrete. The space of the chamber 18 which is not occupied by the concrete mass 28 is left for creation of natural habitat for marine life, filling by sand and soil and for creating conditions suitable for natural growth of plants along the shore line.

As will be appreciated, the opening 16 between the beads 12 and 14 remains half open, allowing easy access to the remainder of the cavity 18. The central opening formed by the tire casing 10, which is normally occupied by the steel rim of the vehicle remains substantially unchanged, which allows passing of cables or chains through that opening and wrapping them about the walls of the modified tubular tire casing 10 and securing of each tire casing 10 to an adjacent similarly modified formed tire casing. As a result, any desired configuration of the mat can be formed using the tire casings 10 of the present invention.

Figure 3:
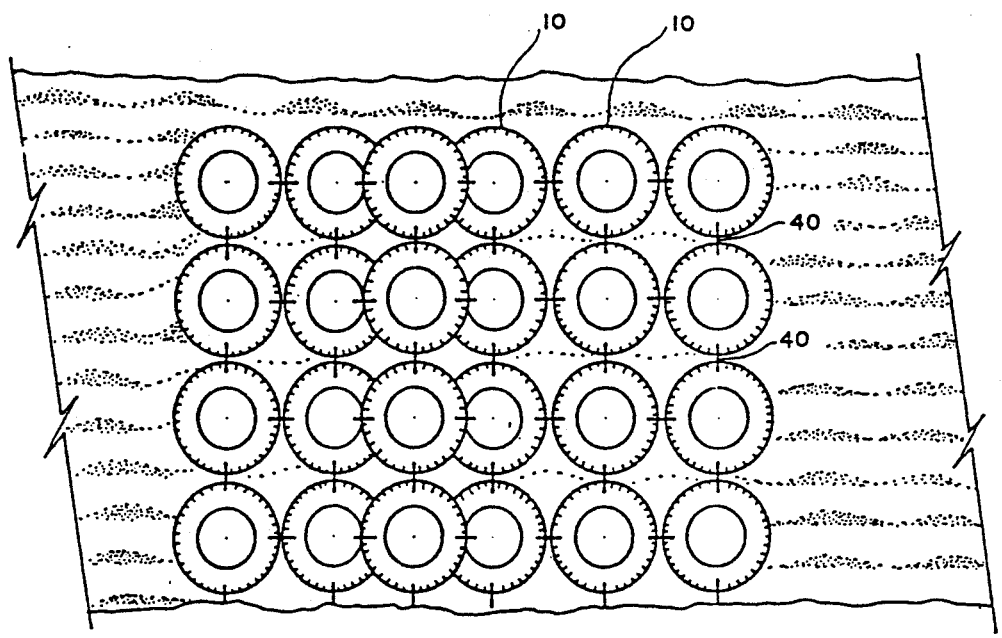
FIG. 3 is a plan view of the mat for protection against coastal erosion formed with the elements of the present invention.
Figure 4:
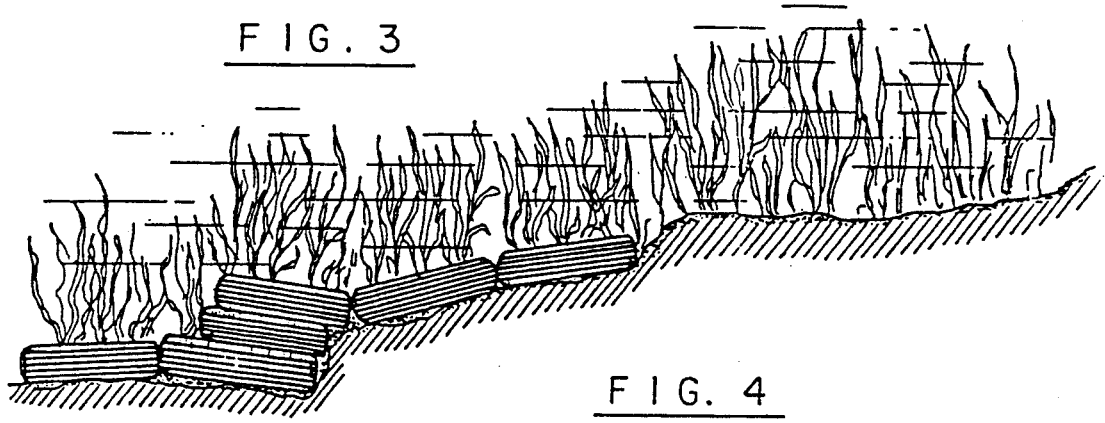
FIG. 4 is a sectional view illustrating positioning of the elements of the apparatus of the present invention to protect a riverbank.

For example, referring to FIGS. 3 and 4, a mat for protection of shore line is schematically shown as being composed of a plurality of modified tire casings 10 arranged in horizontal, staggered or vertical layers and secured together with cables or chains 40. Any flexible securing element can be used for forming of a mat utilizing modified tire casings 10, so as to adapt the mat to the terrain, wherein the mat is to be used for protection against erosion.

Figure 5:
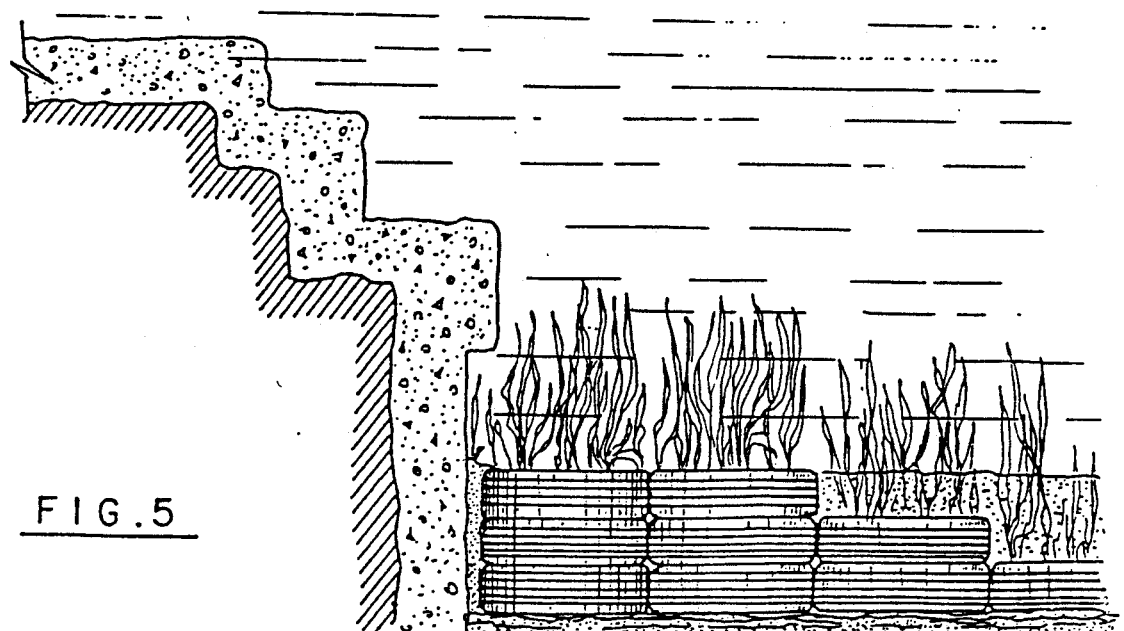
FIG. 5 is a sectional view illustrating positioning of the elements of the apparatus of the present invention adjacent a seawall.

FIG. 5 illustrates an alternative manner of arrangement of the modified tire casings 10 to form a mat and position it along a seawall to protect it from erosion. As shown in the drawings, plants, such as oyster grass can grow within the tires, further naturally securing position of the mat in the area to be protected.

The chains or cables 40 can be formed from rust proof material or the material which will rust with the passing of time. However, the natural erosion due to rusting of the cables or chains 40 will occur at the time when the mat formed by the modified tire casings 10 will have secured itself by filling with sand and grass, thus fulfilling the intended purpose of protection of the shore line against erosion. The tire casings 10 half filled with concrete, will remain submerged, so that the terrain is not visibly amended when looking from the shore. The tire casings 10 are easily transported to the location, wherein they need to be secured and positioned as a unitary mat, by trucks or other transport equipment.

It was observed that the wave action over the tire creates a partial vacuum within the cavity 18, pulling the sand into the tire casing, thus facilitating retention of the tire casings 10 in the desired location.

The conical insert 20 can be made from a sufficiently strong material, such as sheet metal which is welded to form a cone or from other suitably strong material. The concrete can be deposited by pumping along the walls of the insert 20 or by other similar method.

As a result, an easy to manufacture and inexpensive apparatus for protection against coastal erosion is formed utilizing the method of the present invention. While many changes and modifications can be made within the spirit of the present invention, I pray that my rights to the present invention will be limited only by the scope of the appended claims.

I claim:

1. A method of forming a protection barrier member, comprising the following steps:
   providing a vehicle tire casing having a central opening therethrough, a generally U-shaped interior chamber and a lower and upper beads facing the central opening;
   providing a conical insert member having a wider base, a narrower top and an inclined continuous wall extending between the base and the top;
   positioning the insert on a horizontal surface, so that the base rests on the horizontal surface;
   placing the tire casing over the insert, such that the lower bead of the rim frictionally engages the wall of the insert;
   forming a space between the inclined wall of the insert and the upper bead;
   depositing a concrete mixture on the inclined wall of the insert and allowing the mixture to flow downwardly, under gravity, into the interior chamber formed by the tire casing;
   at least partially filling the chamber with concrete;
   allowing the concrete to harden within the tire casing; and
   removing the tire casing from its engagement with the insert.

2. The method of claim 1, further comprising the step of providing a circular reinforcing member and securing the reinforcing member within the interior chamber a distance from walls forming the tire casing.

3. The method of claim 2, further comprising means for securing the reinforcing member within the tire casing.

4. The method of claim 3, wherein said securing means comprises an elongated screw passing through a wall of the tire casing and extending into the interior chamber for retaining the reinforcing member in its predetermined position.

5. The method of claim 1, wherein said wall of the conical insert has an angle of inclination of about between 3 to 10 degrees.

* * * * *